J. L. HECHT.
WHEEL HUB.
APPLICATION FILED APR. 11, 1919.

1,409,174.

Patented Mar. 14, 1922.

INVENTOR
J. L. Hecht
BY
Rogers, Kennedy & Campbell
ATTORNEY

UNITED STATES PATENT OFFICE.

JOSEPH L. HECHT, OF DAVENPORT, IOWA, ASSIGNOR TO G. WATSON FRENCH, NATHANIEL FRENCH, JOSEPH L. HECHT, AND W. H. STACKHOUSE, ALL OF DAVENPORT, IOWA, DOING BUSINESS UNDER THE FIRM NAME OF FRENCH & HECHT.

WHEEL HUB.

1,409,174.   Specification of Letters Patent.   Patented Mar. 14, 1922.

Application filed April 11, 1919. Serial No. 289,371.

*To all whom it may concern:*

Be it known that I, JOSEPH L. HECHT, a citizen of the United States, residing at Davenport, in the county of Scott and State of Iowa, have invented certain new and useful Improvements in Wheel Hubs, of which the following is a specification, reference being had therein to the accompanying drawing.

This invention relates to metal wheels, and has reference more particularly to that type of wheel in which the hub is of tubular form and provided interiorly with a groove or depression constituting a spoke chamber to receive the heads on the ends of the spokes which are riveted thereto, the object of the invention being to reinforce or strengthen the spoke chamber to enable it to withstand the severe strains to which it is subjected in practice. With this end in view, the invention consists in applying to the hub, a reinforcing member of such form and construction and so disposed that it will act to strengthen and reinforce the spoke chamber, the reinforcing member and hub being firmly connected together in fixed relations, preferably by extending the spokes therethrough and riveting the same to the parts.

In the particular form of hub shown in the drawings by way of example to illustrate one application of my invention, the hub is formed from a flat sheet or blank rolled or bent into cylindrical form with its ends abutting, and provided with two circumferential grooves constituting spoke chambers to receive the headed ends of two rows or ranks of spokes, the reinforcing member being either in the form of two short separate sleeves surrounding the respective spoke chambers, or in the form of a single sleeve or collar surrounding both spoke chambers and extending substantially the entire length of the hub, the spokes being extended through the reinforcing member or members and through the chambered portion or portions of the hub and being riveted to said parts, and thereby serving to firmly secure them together in fixed relations. It will be understood, however, that the invention is not limited to such detailed form and construction of the hub, but is applicable as well to a hub provided with but a single spoke chamber to receive a single set of spokes, and also to hubs of other detailed constructional forms, such for instance as those made from seamless tubing or welded pipe, and the like.

Figure 1:
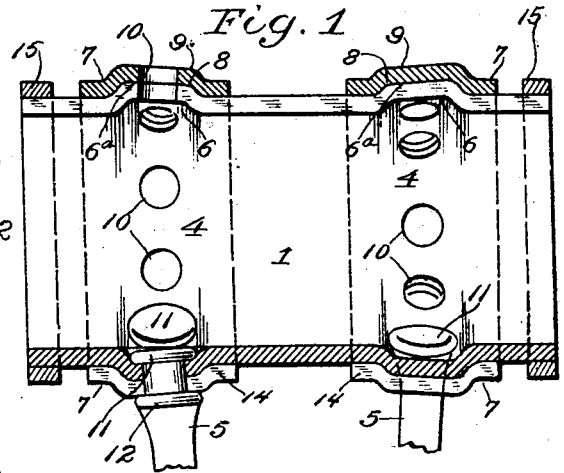
Fig. 1 is a longitudinal section through a hub and the inner connected ends of the spokes, having my invention applied thereto in one form.
Figure 2:
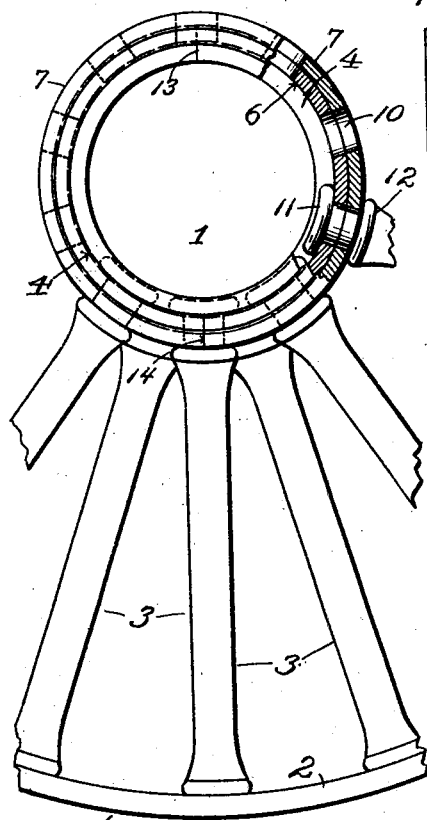
Fig. 2 is an end elevation of the same with certain parts in section.
Figure 3:
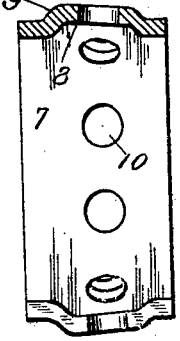
Fig. 3 is a longitudinal sectional elevation of one of the reinforcing members of the form shown in the preceding figures.
Figure 4:
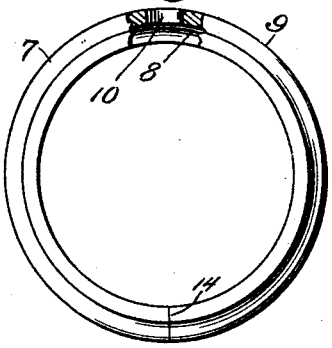
Fig. 4 is an end view of the same partly broken away.

Referring to the drawings:

Referring particularly to Figs. 1 to 4, 1 designates a hub, 2 a rim, and 3 the spokes connected at their outer ends with the rim and connected at their inner ends with the hub. The hub in the present instance is shown formed with two circumferential hub chambers 4 to receive the heads on the inner ends of two rows or ranks of spokes 5, these chambers being formed by bending the material of the hub outwardly in two circumferential areas, thereby producing internal grooves or depressions 6 and corresponding external ribs or circumferential protuberances $6^a$. 7 designates the reinforcing members surrounding the protuberances $6^a$ respectively, and serving to reinforce and strengthen the spoke chambers formed by said protuberances, these reinforcing members consisting each of a sleeve or collar bent outwardly between its edges to form a circumferential internal groove 8 and a corresponding external rib 9, the grooves in the two reinforcing members fitting around and receiving the protuberant portions $6^a$ of the hub. The protuberant portions of the hub and the surrounding reinforcing sleeves are formed with registering openings or holes 10 through which the inner ends of the spokes are extended, and riveted thereto by means of heads 11 on the inner extremities of the spokes seated in the spoke chambers, and shoulders 12 on the spokes bearing against the outer sides of the reinforcing members, the spokes thus serving to connect and hold the hub and reinforcing members in firm and fixed relations.

The hub herein shown by way of example and to which my invention is applied, is formed of a flat sheet or plate which is rolled into cylindrical form with its ends abutting as at 13, and the reinforcing members are likewise made from flat strips rolled into cylindrical form so as to surround the chambered portions of the hub, the ends of these strips abutting as at 14, and being arranged opposite the abutting ends of the hub blank so as to break joints. These abutting ends of the parts may be welded or otherwise fastened together to enable them to better preserve their cylindrical forms, and the contacting surfaces of the hub and surrounding reinforcing members may be spot-welded to assist in effecting their firm and solid union, or they may be riveted together.

Figure 6:
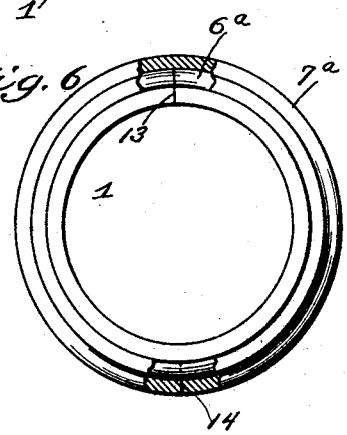
Fig. 6 is an end view of the same with parts broken away.
Figure 5:
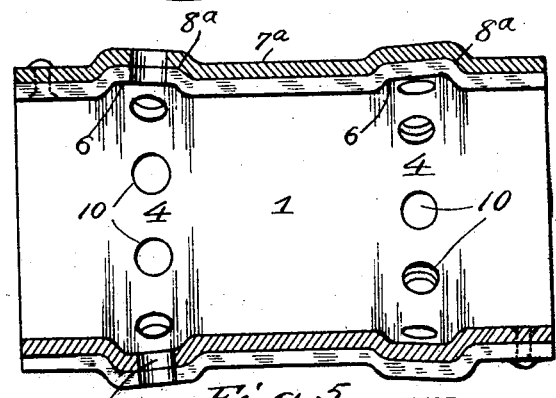
Fig. 5 is a view similar to Fig. 1, but showing the reinforcing member in a different form.

In the form of the invention shown in Figs. 5 and 6, the construction is the same as above described, except that in this case the reinforcing member 7ª is in the form of a single collar or sleeve extending throughout the length of the hub, and is provided at points opposite the protuberant portions of the hub, with internal circumferential grooves 8ª which surround and receive said protuberant portions.

In the form of the parts shown in Fig. 1, where the reinforcing members are in the form of short separate sleeves, the ends of the hub may be encircled by solid rings or bands 15 to reinforce the hub at these points and resist the tendency of the abutted ends of the blank to separate under severe pressure or strain.

Having thus described my invention, what I claim and desire to secure by Letters Patent of the United States is as follows:

1. A metal wheel hub provided with a protuberant spoke chamber, and a reinforcing member applied to the chambered portion of the hub and having a concavity receiving the protuberance of the spoke chamber to reinforce the same.

2. A metal wheel hub provided with a circumferential protuberant spoke chamber, and an external circumferential reinforcing member applied to the chambered portion of the hub and provided with an internal concavity receiving the exterior of the circumferential protuberance of the spoke chamber.

3. A metal wheel hub formed with a circumferential groove on its interior and a corresponding rib on its exterior, and an external reinforcing member formed with an internal circumferential groove surrounding and reinforcing the circumferential rib exteriorly.

4. A metal wheel hub provided with a plurality of circumferential protuberant spoke chambers spaced apart axially of the hub, and an external reinforcing member surrounding the hub and provided with a plurality of interior circumferential cavities receiving the protuberances of the respective spoke chambers to reinforce the same.

5. A metal wheel hub comprising a blank or plate bent into cylindrical form with its ends abutting, and provided on its interior with a circumferential groove and on its exterior with a corresponding protuberance forming an internal circumferential spoke chamber, and a reinforcing member comprising a metal plate bent into cylindrical form and surrounding the hub with its ends abutting and breaking joint with the ends of the hub blank, said reinforcing member being provided with an internal circumferential groove embracing the circumferential protuberance on the hub.

6. A wheel hub having an internal spoke chamber formed of a plurality of layers of metal to reinforce the same, the inner layer being formed with an internal open cavity and a corresponding external protuberance, and the next outer layer being formed with an internal cavity receiving said protuberance, the said open internal cavity in the inner layer being adapted to receive the riveting heads on the spokes, and the bottom of the cavity being adapted to offer a flat bearing for said heads.

In testimony whereof, I have affixed my signature hereto.

JOSEPH L. HECHT.